Patented July 28, 1925.

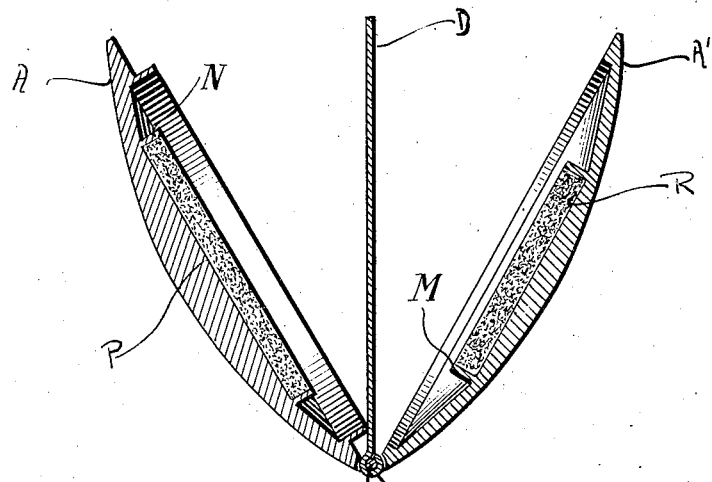
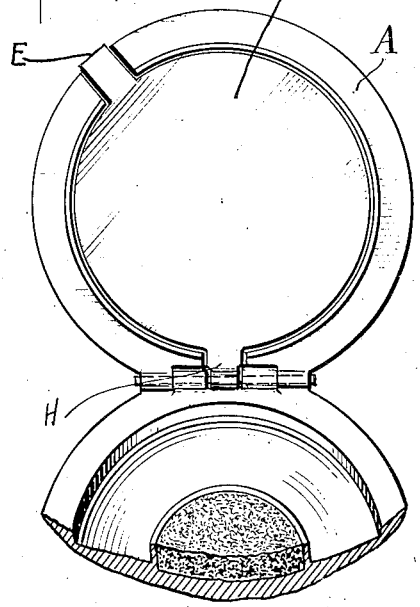
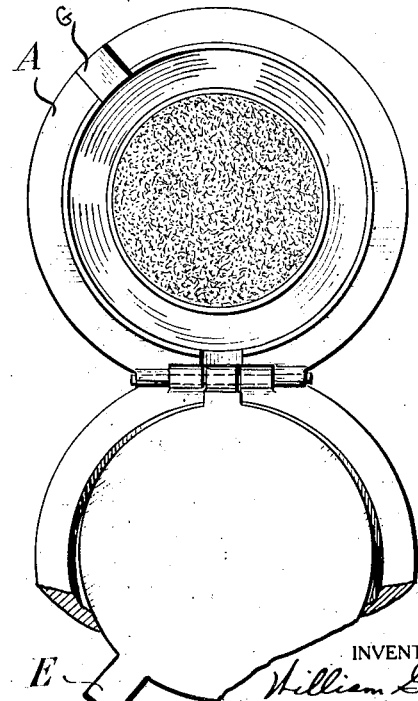

1,547,587

UNITED STATES PATENT OFFICE.

WILLIAM G. KENDALL, OF NEWARK, NEW JERSEY, ASSIGNOR, BY MESNE ASSIGNMENTS, TO PARFUMERIE RIGAUD, INC., OF NEW YORK, N. Y., A CORPORATION OF NEW YORK.

METAL COMPACT HOLDER.

Application filed December 5, 1924. Serial No. 754,084.

*To all whom it may concern:*

Be it known that I, WILLIAM G. KENDALL, a citizen of the United States, residing at Newark, in the county of Essex and State of New Jersey, have invented a certain new and useful Improvements in Metal Compact Holders, of which the following is a specification.

This invention relates to improvements in metal compact holders and has for its object the provision of a metal compact holder for holding powder and rouge which shall occupy the smallest space possible, which will be convenient to carry and economical to manufacture.

Further objects of the invention will be apparent from the appended specification and drawings in which—

Figure 1 is a sectional view of my improved compact holder open,

Figure 2 is a perspective view of my improved compact holder open and showing the rouge receptacle and mirror, Figure 3 is a perspective view of my improved compact holder partly in section and showing the powder compact.

A and A' denote two equal metal members having a slight curvature which form the body of my improved compact holder. These members A and A' are held together by the hinge B and on the pintle C of the hinge B is also mounted a flat metallic mirror D which occupies a minimum of space and has several important functions as will be hereinafter described. In the member A is located the powder pad and in the opposite member A' the rouge pad, sufficient space being given so that a powder puff can also be carried over the rouge or powder pad.

The mirror D has an extended member E formed integrally therein which serves as a finger hold and to open the holder when closed. This finger hold E fits into the depression G shown in Figure 3 of the member A. The member D is made of metal having a mirror surface on each side and not only separates the rouge and powder compartments from each other, but also serves through the extension E as the means of opening the compact holder. The mirror D is hinged directly to the pintle C of the hinge B by the member H which is an integral part of the mirror D, the end of H being bent directly over the pintle C. The hinge member D therefore has three parts, the mirror part proper, the extension and finger hold E and the hinge member H, but all of these parts are formed from a single sheet of metal.

The rings M and N form the walls of compartments for a compact rouge and a compact face powder respectively.

By this construction a compact holder of extreme thinness and simplicity is made.

Having thus fully described my invention, what I claim is:—

1. In a compact holder, two equal and opposite members having a slight curvature, a hinge joining said members at one edge thereof, a metallic plate fixed on said hinge having a mirror surface on both sides and ring members formed on the holder members on each side of said mirror surface adapted to partially overlay a compact on each side of said mirror plate.

2. In a compact holder, two equal and opposite members having a slight curvature, a hinge joining said members at one edge thereof, a metallic plate separating said members, said plate having a mirror surface on both sides, ring members formed on the holder members on each side of said metallic plate, confining a powder puff and compact compartment on each side, so that the curved space made by each curved member is substantially filled with the powder puff and compact on each side.

In testimony whereof I hereunto affix my signature.

WILLIAM G. KENDALL.